(12) United States Patent
Tang et al.

(10) Patent No.: US 6,985,267 B2
(45) Date of Patent: Jan. 10, 2006

(54) DUAL-CARRIAGE SCANNING APPARATUS

(75) Inventors: Tom Tang, Hsinchu (TW); Ted Liu, Jungli (TW); Ta-Yi Lee, Shindian (TW)

(73) Assignee: Lite-On Technology Corporation, Taipei (TW)

( * ) Notice: Subject to any disclaimer, the term of this patent is extended or adjusted under 35 U.S.C. 154(b) by 875 days.

(21) Appl. No.: 09/920,812

(22) Filed: Aug. 3, 2001

(65) Prior Publication Data

US 2002/0057471 A1 May 16, 2002

(30) Foreign Application Priority Data

Nov. 15, 2000 (TW) ................. 89219805 U

(51) Int. Cl.
*H04N 1/04* (2006.01)
(52) U.S. Cl. ............... 358/474; 358/497; 358/496; 358/487; 358/506
(58) Field of Classification Search ............... 358/474, 358/498, 497, 496, 487, 506, 505
See application file for complete search history.

(56) References Cited

U.S. PATENT DOCUMENTS

| | | | | |
|---|---|---|---|---|
| 3,512,886 A | * | 5/1970 | Wirley et al. ............... 355/70 |
| 3,918,806 A | * | 11/1975 | Cook ........................ 399/210 |
| 4,209,248 A | * | 6/1980 | Gibson et al. ............. 399/200 |
| 4,634,267 A | * | 1/1987 | Jones et al. ................. 355/66 |
| 5,710,643 A | * | 1/1998 | Depiano .................... 358/487 |
| 5,903,001 A | * | 5/1999 | Tsai ........................... 250/234 |
| 5,995,244 A | * | 11/1999 | Tsai ........................... 358/474 |
| 6,005,680 A | * | 12/1999 | Luther et al. .............. 358/2.1 |
| 6,285,803 B1 | * | 9/2001 | Couwenberg et al. ...... 382/299 |
| 6,608,707 B1 | * | 8/2003 | Han .......................... 358/497 |
| 6,667,817 B1 | * | 12/2003 | Stocker ...................... 358/475 |
| 2002/0018247 A1 | * | 2/2002 | Hanabusa ................... 358/474 |
| 2002/0080421 A1 | * | 6/2002 | Chiu .......................... 358/474 |

* cited by examiner

*Primary Examiner*—Kimberly Williams
*Assistant Examiner*—Negussie Worku
(74) *Attorney, Agent, or Firm*—Rabin & Berdo, P.C.

(57) ABSTRACT

A scanning apparatus adaptable for two resolutions has two carriages with different resolutions. The carriages are disposed in the cover and the scanning bed of the scanning apparatus respectively. Each carriage includes a lens and a sensing module and the sensing module and the lens are at a fixed distance. The optical lengths between the lenses and the documents to be scanned are different so that the resolution produced by the carriage in the cover is different from the resolution produced by the carriage in the scanning bed.

11 Claims, 5 Drawing Sheets

DUAL-CARRIAGE SCANNING APPARATUS

BACKGROUND OF THE INVENTION

This application incorporates by reference Taiwan application Serial No. 89219805, filed Nov. 15, 2000.

1. Field of the Invention

The invention relates in general to an apparatus adaptable for two scanning resolutions, and more particularly to dual-carriage scanning apparatus.

2. Description of the Related Art

As the technology progresses, the integration and application of multimedia have become the current trend. With increases in performance and decreases in price, multimedia is now commonplace. Multimedia, so to speak, is the use of computers to present different types of information, such as text, images and sound, in an integrated way. There are several kinds of multimedia devices developed for capturing and presenting images or sound. As for image processing, the scanning apparatus is a common tool for users to capture images.

Referring to FIG. 1A, a perspective view of a conventional flatbed scanner is shown. The flatbed scanner includes a scanning bed 102 and a cover 104. The scanning bed 102 has a platform 106. The glass plate 108 positioned on the scanning bed 102 is capable of placing the document to be scanned 111. The cover 104 is coupled to the scanning bed 102 by hinge 110. The document to be scanned 111 is first placed on the scanning bed 106. After the cover 104 is closed, the carriage (not shown in FIGs) disposed inside the scanning bed 106 is driven to sense the image of the document to be scanned 111 and start to scan.

Referring to 1B, a lateral sectional view of the conventional flatbed scanner in FIG. 1A is shown. As shown in FIG. 1B, the scanning bed 102 has a carriage 112. The carriage 112 is capable of scanning the image of the document to be scanned 111. The carriage 112 includes a lens 116 and a sensing module 118. The lamp 114 positioned in the carriage 112 provides the illumination for scanning. In case the document to be scanned is a reflective document, the image formation in reflective scanning mode is as follows. The light generated from the lamp 114 is first reflected by the document to be scanned 111, the reflected light is then entering the lens 116. It can form the image of the document to be scanned 111 on the sensing module 118 by focusing the lens 116. The sensing module 118 transforms the received image signals to electric signals for processing and reads the image information sensed. There are various kinds of sensing module such as the CCD (Charge Coupled Device) or CIS (Contact Image Sensor) equipped with the above-mentioned function.

After reading the image signals, the stepping motor (not shown in FIGs) drives the carriage 112 to move slightly toward the area to be scanned and then the sensing module 118 reads the next image information sensed. Repeating the foregoing steps can finish the scan of the document to be scanned 111. In case the document to be scanned is a transmissive document, the image formation principle can be also applied. What needs to be noticed, the distinction of the transmissive scanning mode is utilizing the lamp 114 positioned in the cover 104. The light generated from the lamp 114 passes through the document to be scanned 111 and the image of the document to be scanned 111 is formed on the sensing module 118.

Referring to FIG. 2, the distance between the object and the lens and the distance between the lens and the optical sensing module are shown. As shown in FIG. 2, the distance between the lens 202 and the sensing module 204 is m and the optical length between the lens 202 and the document to be scanned 206 is n. The distance m and the optical length n are the determinants of the resolution of the carriage. Any variation in the distance m or the optical length n can change the scanning resolution.

Most scanners available today are capable of producing images at a single resolution. A scanning apparatus with changeable resolution has been disclosed in Taiwan Publication No. 233829, which utilizes the variation in the distance m to provide different resolutions. In the structure of the carriage, however, the distance m between the lens 202 and the sensing module 204 is very short. It requires not only high-precision stepping motor but also high-precision instrument to drive the stepping motor. It increases the difficulty of the accuracy adjustment and the cost of manufacture.

SUMMARY OF THE INVENTION

It is therefore an object of the invention to provide a scanning apparatus adaptable for two resolutions produced by different optical lengths between the lenses and the documents to be scanned. It decreases the difficulty of the accuracy adjustment and increases the industrial utility.

The invention achieves the above-identified objects by providing a scanning apparatus adaptable for two resolutions. The scanning apparatus has two carriages with different resolutions. The carriages are disposed in the cover and the scanning bed of the scanning apparatus respectively. Each carriage includes a lens and a sensing module and the sensing module and the lens are at a fixed distance. The optical lengths between the lenses and the documents to be scanned are different so that the resolution produced by the carriage in the cover is different from the resolution produced by the carriage in the scanning bed.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1A:
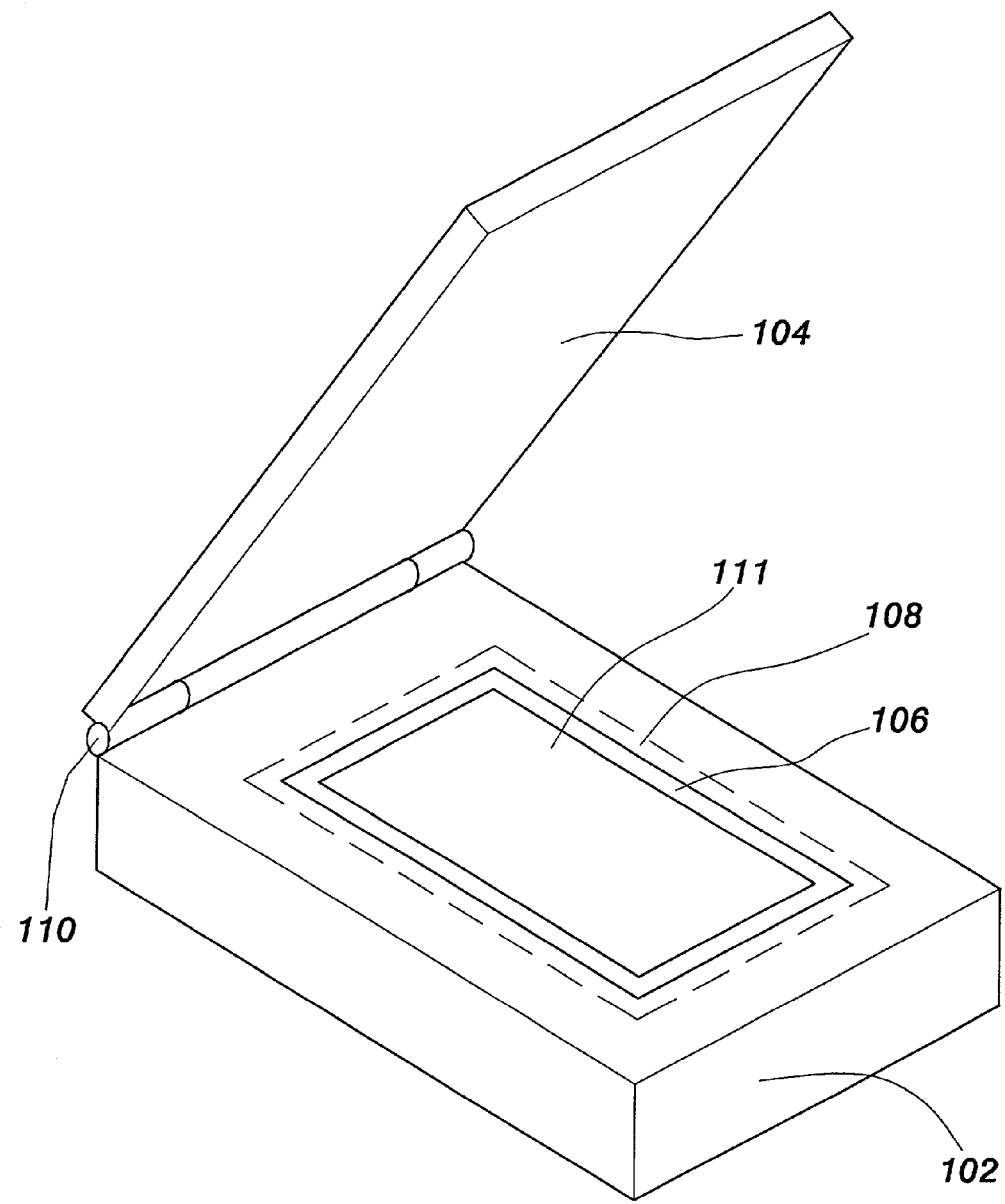
FIG. 1A shows a perspective view of a conventional flatbed scanner.
Figure 1B:
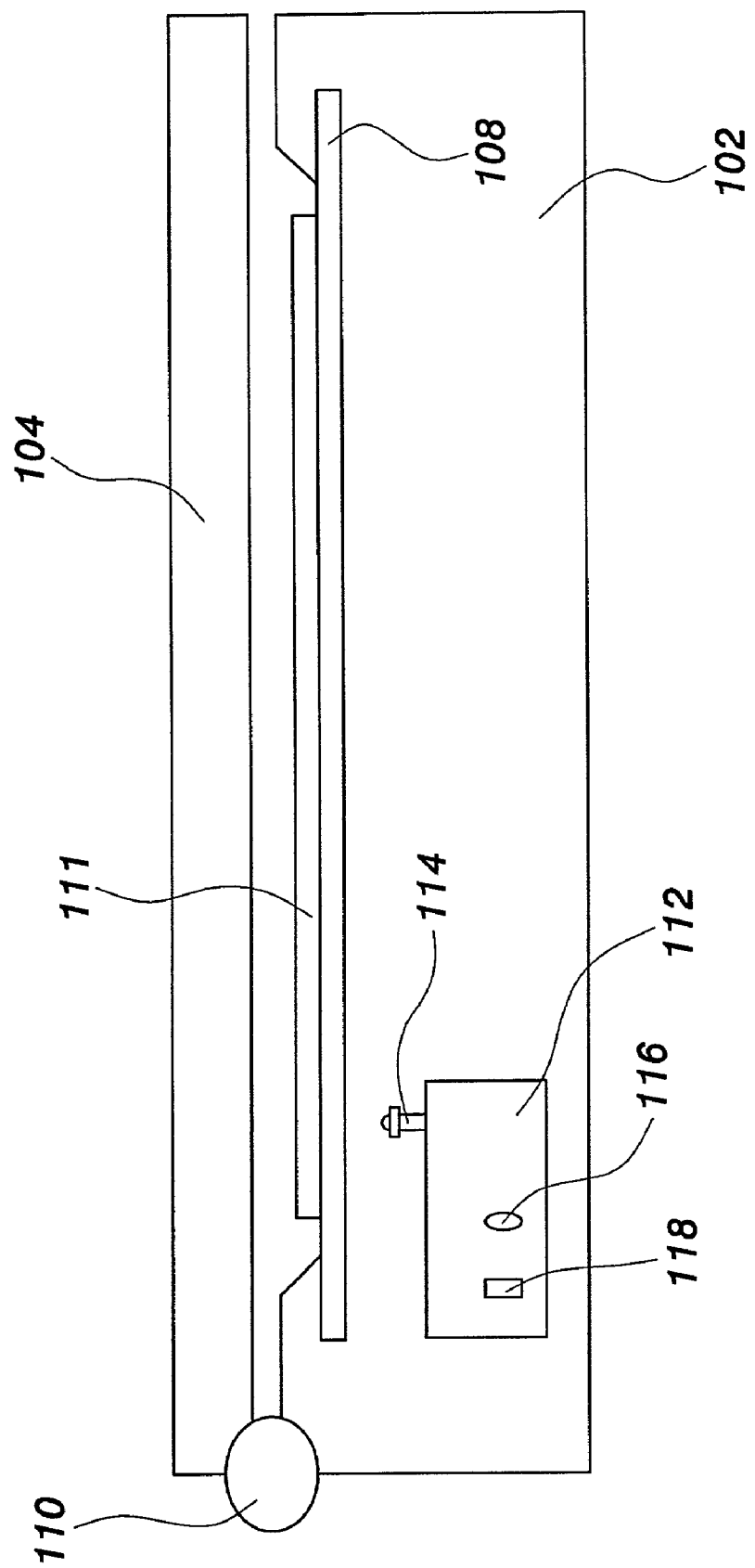
FIG. 1B shows a lateral sectional view of the conventional flatbed scanner in FIG. 1A.
Figure 2:
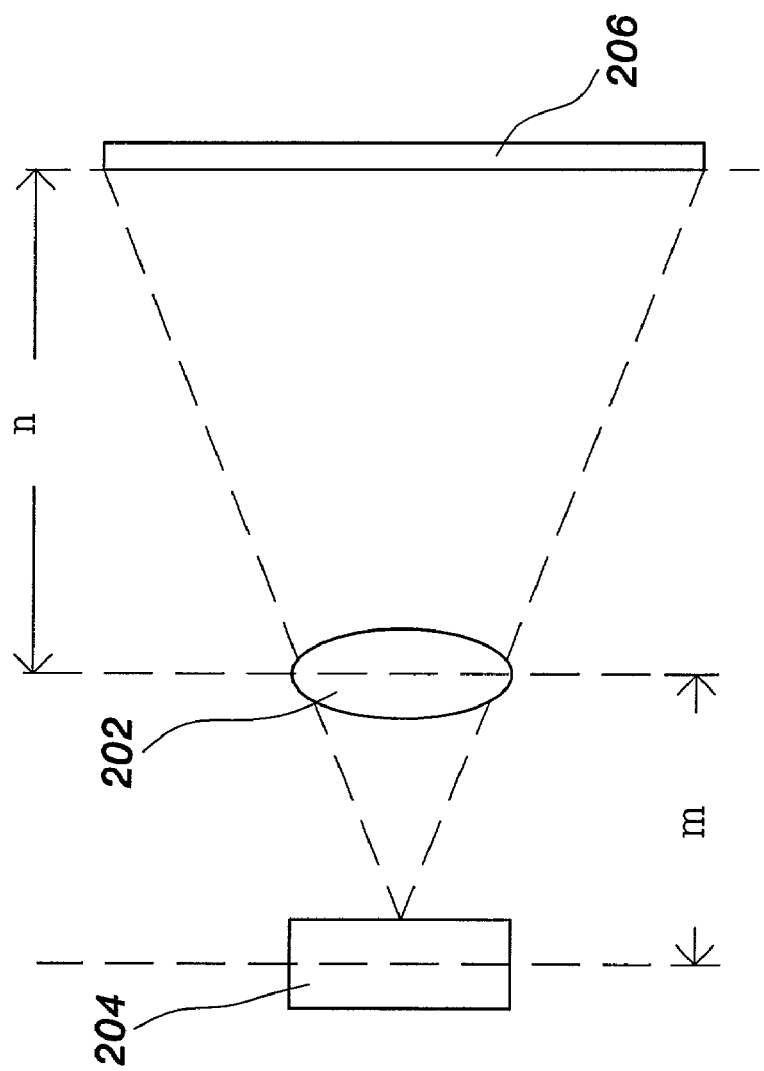
FIG. 2 illustrates the distance between the object and the lens and the distance between the lens and the optical sensing module.
Figure 3:
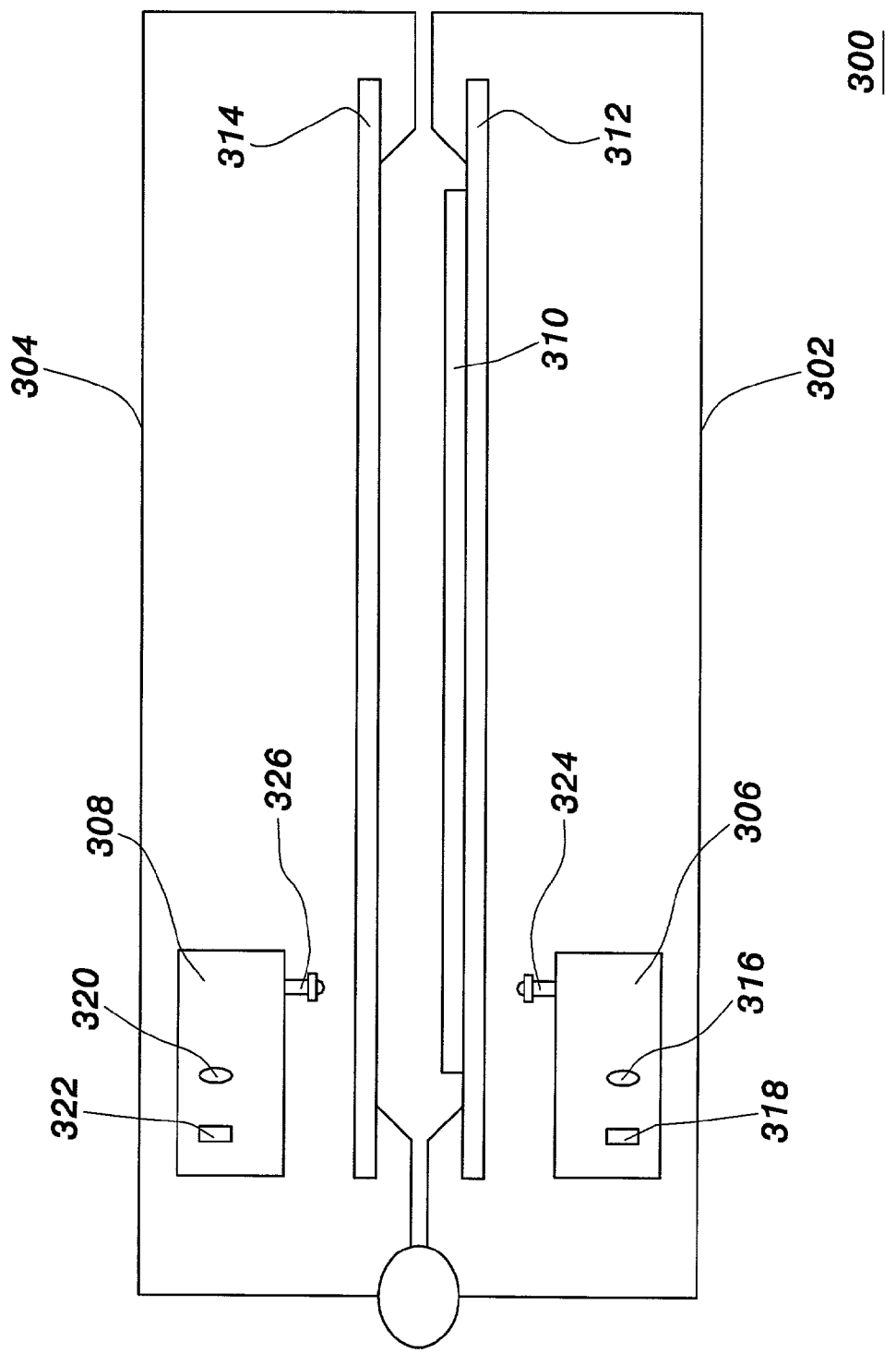
FIG. 3 shows a lateral sectional view of a scanning apparatus adaptable for two resolutions according to the preferred embodiment of the invention.

Referring to FIG. 3, a lateral sectional view of a scanning apparatus adaptable for two resolutions according to the preferred embodiment of the invention is shown. The scanning apparatus adaptable for two resolutions includes a scanning bed 302 and a cover 304. There are two carriages with different resolutions disposed in the scanning bed 302 and the cover 304 respectively. Hence, the dual-carriage scanning apparatus is adaptable for two different resolutions. While scanning the document to be scanned 310, using the carriage 306 in the scanning bed 302 produces one resolution and using the carriage 308 in the cover 304 produces another resolution.

Figure 4:
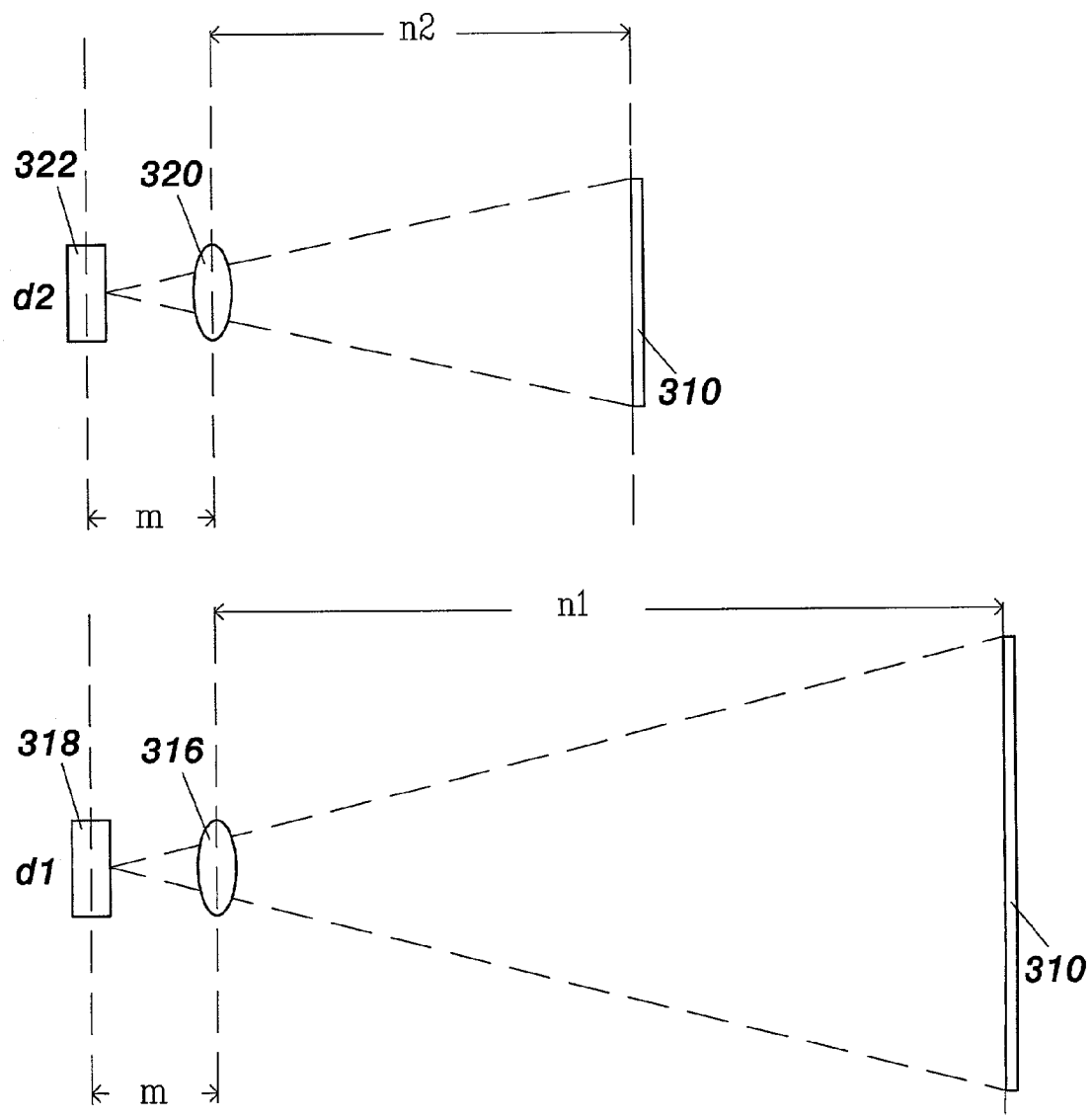
FIG. 4 shows the ways to form two different resolutions according to the preferred embodiment of the invention.

Referring to FIG. 4, the ways to form two different resolutions according to the preferred embodiment of the invention is shown. Please also refer to FIG. 3. As shown in FIG. 4, the sensing module 318 and the lens 316 in the carriage 306 are at a distance of m and the sensing module 322 and the lens 320 in the carriage 308 are at a distance of m as well. That is, the distance between the sensing module 318 and the lens 316 are the same with the distance between the sensing module 322 and the lens 320. The different designs of the two carriages 306 and 308 are the optical lengths. The optical length between the lens 316 and the document to be scanned 310 is n1 while the optical length between the lens 320 and the document to be scanned 310 is n2. The distance and the optical length are the determinants of the resolution of the carriage. Consequently, the resolution d1 of the carriage 306 is produced by the distance m and the optical length n1 and the resolution d2 of the carriage 308 is produced by the distance m and the optical length n2.

This scanning apparatus according to this invention utilizes the variation in the optical length n to provide different resolutions. It can adjust two resolutions precisely and conveniently without the requirement of high-precision stepping motor or instrument since the optical length n is far longer than the distance m. Besides, the resolution d1 and resolution d2 changes with the multiple relation between n1 and n2. For instances, the carriage 306 with the optical length n1 produces resolution 1200 dpi (d1=1200 dpi) while the carriage 308 with the optical length n2 produces resolution 2400 dpi (d2=2400 dpi), wherein the n1 and n2 are in a multiple relation. Consequently, the two carriages with different optical lengths can produce different resolutions under a fixed distance m between the sensing module and the lens even though the sensing modules and lenses of the carriages are the same. The parameters mentioned above are some examples but not for restricting the invention, any person skilled in the art could substitute the parameters to achieve the similar function without departing from the spirit and scope of the invention.

The scanning apparatus adaptable for two resolutions according to the preferred embodiment of the invention has two carriages with different optical lengths. It can adjust two resolutions precisely and conveniently without the requirement of high-precision stepping motor or instrument. It decreases the difficulty of the accuracy adjustment and the cost of manufacture.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning apparatus adaptable for two resolutions, wherein the scanning apparatus includes a scanning bed and a cover positioned above the scanning bed whereby the scanning apparatus is capable of scanning a document therebetween, the scanning apparatus further comprising:
   a first carriage disposed in the cover, wherein the first carriage comprises:
   a first lens with a first optical length between the first lens and the document to be scanned; and
   a first sensing module with a distance between the first sensing module and the first lens;
   a second carriage disposed in the scanning bed, wherein the second carriage comprises:
   a second lens with a second optical length between the second lens and the document to be scanned; and
   a second sensing module with the distance between the second sensing module and the second lens;
   wherein a first resolution is produced by the first carriage with the first optical length and a second resolution is produced by the second carriage with the second optical length.

2. The scanning apparatus according to claim 1, wherein the first resolution is a multiple of the second resolution.

3. The scanning apparatus according to claim 2, wherein the multiple is two.

4. The scanning apparatus according to claim 1, wherein the second resolution is a multiple of the first resolution.

5. The scanning apparatus according to claim 4, wherein the multiple is two.

6. The scanning apparatus according to claim 1, wherein the first sensing module is a CCD (Charge Coupled Device).

7. The scanning apparatus according to claim 1, wherein the first sensing module is a CIS (Contact Image Sensor).

8. The scanning apparatus according to claim 1, wherein the second sensing module is a CCD (Charge Coupled Device).

9. The scanning apparatus according to claim 1, wherein the second sensing module is a CIS (Contact Image Sensor).

10. The scanning apparatus according to claim 1, wherein the document to be scanned is a reflective document.

11. The scanning apparatus according to claim 1, wherein the document to be scanned is a transmissive document.

* * * * *